(12) United States Patent
Inoue et al.

(10) Patent No.: US 9,187,092 B2
(45) Date of Patent: Nov. 17, 2015

(54) CONTROL APPARATUS FOR VEHICLE (75) Inventors: Go Inoue, Gotenba (JP); Yoji Kunihiro, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/378,379

(22) PCT Filed: Mar. 2, 2012

(86) PCT No.: PCT/JP2012/055413
§ 371 (c)(1),
(2), (4) Date: Aug. 13, 2014

(87) PCT Pub. No.: WO2013/128638
PCT Pub. Date: Sep. 6, 2013

(65) Prior Publication Data
US 2015/0019082 A1    Jan. 15, 2015

(51) Int. Cl.
*B62D 6/00* (2006.01)
*B60W 30/12* (2006.01)
*B62D 1/28* (2006.01)
*B62D 15/02* (2006.01)

(52) U.S. Cl.
CPC .............. *B60W 30/12* (2013.01); *B62D 1/286* (2013.01); *B62D 15/025* (2013.01)

(58) Field of Classification Search
None
See application file for complete search history.

(56) References Cited

U.S. PATENT DOCUMENTS

2002/0169531 A1    11/2002    Kawazoe et al.
2011/0264329 A1    10/2011    Limpibunterng et al.

FOREIGN PATENT DOCUMENTS

| JP | 2002-67998 | 3/2002 |
| JP | 2002-302058 | 10/2002 |
| JP | 2002-302059 A | 10/2002 |
| JP | 2004-299594 | 10/2004 |
| JP | 2010-528936 | 8/2010 |
| JP | 2011-31770 | 2/2011 |
| WO | 2008/155501 A2 | 12/2008 |
| WO | 2010/073400 A1 | 7/2010 |

OTHER PUBLICATIONS

International Search Report issued Jun. 5, 2012, in PCT/JP2012/055413, filed Mar. 2, 2012.

*Primary Examiner* — Mussa A Shaawat
*Assistant Examiner* — Abdhesh Jha
(74) *Attorney, Agent, or Firm* — Oblon, McClelland, Maier & Neustadt, L.L.P.

(57) ABSTRACT

An apparatus for controlling a vehicle provided with a steering apparatus is provided with: a first target controlled variable setting device for setting a first target controlled variable regarding the steering apparatus for track control which makes a track of the vehicle follow a target track; a controlling device for performing the track control by controlling the steering apparatus on the basis of the set first target controlled variable; a specifying device for specifying magnitude of a steering input and frequency in a period of performing the track control; and a determining device for determining whether or not the steering input is overriding on the basis of the specified magnitude and frequency.

5 Claims, 5 Drawing Sheets

CONTROL APPARATUS FOR VEHICLE

TECHNICAL FIELD

The present invention relates to a control apparatus for a vehicle, for performing track control to make a vehicle follow a target driving route, such as, for example, lane keeping assist (LKA), in the vehicle which is provided with some kind of steering apparatus such as, for example, an electric power steering (EPS) and a variable gear ratio steering (VGRS).

BACKGROUND ART

This type of track control is disclosed, for example, in Patent Literature 1. A driving support apparatus for a vehicle which is disclosed in the Patent Literature 1 is configured to make the vehicle, which is provided with a steering torque assisting device and a steering angle varying device, follow a target driving route by using the steering torque assisting device and to suppress a change in vehicle behavior which occurs at the time of the following by using the steering angle varying device.

On the other hand, even in a period of performing this type of track control, a steering operation based on a driver's intention, so-called overriding, occurs irregularly on various scales. A change in steering angle which is caused by the overriding frequently interferes with a change in steering angle in the track control. Therefore, highly accurate detection of the overriding is desired in the vehicle in which this type of track control is performed. In this regard, a conventional apparatus including the apparatus disclosed in the Patent Literature 1 is configured to determine the presence or absence of the overriding on the basis of the magnitude of various steering inputs, such as a steering wheel angle, a steering wheel angular velocity, a steering torque, controlled variables corresponding thereto and the like.

Incidentally, as a technology for preventing the interference between driver steering and steering by an actuator, there is also proposed an apparatus which is configured to use a front-wheel steering device to control a low frequency component of a target yaw rate and to use a rear-wheel steering device to control a high frequency component corresponding to disturbance (e.g. refer to Patent Literature 2).

Moreover, Patent Literature 3 discloses a technology in which low-pass filtering is performed on a signal corresponding to the steering angle and a technology in which a dead zone is prepared for the steering wheel angle.

Moreover, Patent Literature 4 discloses a technology for changing characteristics of steering force, such as the dead zone, on the basis of a driver's private unique information.

CITATION LIST

Patent Literature

Patent Literature 1: Japanese Patent Application Laid Open No. 2011-031770
Patent Literature 2: Japanese Patent Application Laid Open No. 2002-302508
Patent Literature 3: Japanese Patent Application Laid Open No. 2010-528936
Patent Literature 4: Japanese Patent Application Laid Open No. 2004-299594

SUMMARY OF INVENTION

Technical Problem

By the way, in the period of performing the track control, not only the overriding based on the driver's intention described above but also the steering input which is independent of the driver's intention can also occur. For example, if the driver coughs, sneezes, looks away, or loses his or her attention to driving, a steering wheel moves in some cases independently of the driver's intention. Alternatively, this type of steering input against the driver's intention can also occur depending on a driving condition such as unevenness of a road surface, a cross wind and the like. Those are a type of disturbance, and it is desirable that the change in vehicle behavior which is caused by them is to be quickly suppressed originally by the track control.

However, a system, which is not provided with a device configured to judge the driver's intention, recognizes each of the overriding and the disturbance are as a type of steering input. If only the magnitude of the steering input is used for the determination of the overriding in a conventional way, the overriding and the disturbance cannot be distinguished.

Although a practical operation aspect of the track control upon detecting the overriding is not limited to single aspect, the track control is hardly performed in a driver's desirable manner if the overriding and the disturbance cannot be distinguished. For example, if the track control is configured to stop when the overriding is detected, the track control stops even for the disturbance, and the driver thus feels like the track control is ended independently of the driver's intention. Moreover, if the change in vehicle behavior which is caused by the disturbance is configured to be corrected by the track control, even a minor steering operation based on the driver's intention is corrected by the track control, and the driver thus easily feels uncomfortable about the driver's intention not being reflected in the vehicle behavior.

In other words, the conventional technology has such a technical problem that it is hard to accurately determine whether or not the steering input which is given when the track control is performed is the overriding. Therefore, there is still a room for improvement on the practical operation side of the track control. This is also the same even in the apparatuses disclosed in the Patent Literatures 2 to 4.

In view of the circumstances, it is therefore an object of the present invention to provide a control apparatus for a vehicle which can accurately determine whether or not the steering input which is given when the track control is performed is the overriding. It is also desirably an object of the present invention to provide the control apparatus for the vehicle which enables the track control to be preferably performed on the basis of a result of the determination.

Solution to Problem

In order to solve the above problem, the control apparatus for the vehicle of the present invention is an apparatus for controlling the vehicle, the vehicle is provided with a steering apparatus, the control apparatus is provided with: a first target controlled variable setting device for setting a first target controlled variable regarding the steering apparatus for track control which makes a track of the vehicle follow a target track; a controlling device for performing the track control by controlling the steering apparatus on the basis of the set first target controlled variable; and a determining device for determining whether or not the steering input is overriding on the basis of magnitude and frequency of a steering input when the track control is performed (a first item).

According to the control apparatus for the vehicle of the present invention, it is determined whether or not the steering input is the overriding on the basis of the magnitude and the frequency of the steering input generated when the track control is performed. It is therefore possible to accurately determine whether or not the steering input is the overriding which is a steering operation based on a driver's explicit intention.

According to the study of the applicants, the overriding based on the driver's intention is, for example, the steering input in a low frequency band of about 1 Hz. In contrast, a frequency band of the disturbance which is a concept including the steering input other than the overriding is on a higher frequency side than that of the overriding. Of course, they are not in a simple relation in which they can be clearly distinguished only by the frequency band. At least, as a qualitative tendency, the frequency band in which the overriding typically occurs is different from the frequency band in which the disturbance typically occurs.

Therefore, in view of both of the magnitude and the frequency, although they cannot be accurately classified in perfect, it is possible to determine that the steering input which is likely the overriding is the overriding and that the steering input which is likely disturbance is the disturbance, respectively, in accordance with their own predetermined determination criteria. In other words, according to the control apparatus for the vehicle of the present invention, the steering input which is treated collectively as the overriding or the disturbance can be clearly classified into the overriding and the disturbance.

Here, a technology of accurately classifying the steering input into the overriding and the disturbance has an effect on improving the quality of the track control. In other words, if the steering input occurs when the track control which is to make the track of the vehicle follow the target track is performed, it is desirable to quickly suppress a deviation from the target track due to the steering input, from a viewpoint of the original role of the track control. However, the overriding is an indication of the driver's intention, and thus the deviation from the target track due to the overriding is the driver's intention. Therefore, in this case, the track control interferes with the driver's intention. On the other hand, if the track control is stopped or limited in the same manner when the steering input occurs in the period of performing the track control which is to make the track of the vehicle follow the target track in order to eliminate this type of interference, then, the track control is stopped or limited even though the driver desires to continue the track control, and this is also against the driver's intention.

If the steering input can be classified into the overriding and the disturbance, it is possible to potentially realize such a control that the change in vehicle's behavior due to the disturbance is quickly suppressed while allowing the change in the vehicle's behavior due to the overriding, or a similar control, and it is thus possible to provide high-quality track control which is not against the driver's intention. In other words, according to the control apparatus for the vehicle of the present invention, the steering input can be accurately reflected in the track control performed by the controlling device on the basis of the first target controlled variable.

Incidentally, there are at least two types of disturbances expected by the control apparatus for the vehicle of the present invention; one is a steering operation which does not reflect the driver's intention, and the other is an external input caused by a driving environment. The former is a steering input caused by a physical operation such as coughing, sneezing or the like, and the latter is a steering input due to unevenness of a road surface, an obstacle, an inclination, a friction coefficient, or a change in the vehicle' behavior caused by a cross wind or the like. Moreover, the overriding expected by the control apparatus for the vehicle of the present invention includes, for example, a steering input which is given to offset a lateral position of the vehicle on a target driving route in a left or right direction from the center of a lane, or the like.

Incidentally, in the control apparatus for the vehicle of the present invention, a process for clearly specifying the frequency of the steering input is not always required. For example, the determining device or a signal input system to the determining device may be accompanied by a frequency selection function in advance. The frequency selection function is a so-called filtering function, and can be realized preferably by some kind of a filtering apparatus such as an analog filter, a digital filter or the like. If such a configuration is used, passing the steering input through the filter can alternatively achieve the effect of specifying the frequency of the steering input.

However, the frequency of the steering input can be also specified by performing a fast Fourier transfer (FFT) process or the like on the steering input obtained by some kind of a sensor. In this case, a sensor value which is obtained by some kind of the sensor can be obtained as the magnitude of the steering input and the magnitude and the frequency of the steering input can be obtained as values which can be referred to in the control. For example, if the determining device is provided with this type of FFT function, or if a processor having this type of FFT function is provided in an input side system of the determining device, then, the frequency of the steering input can be specified. In this case, it is also possible to realize a pseudo-filtering effect by multiplying a passage gain or the like which is set for each frequency in advance.

In another aspect of the control apparatus for the vehicle of the present invention, the steering input is a steering wheel angle, a target angle of the steering apparatus with respect to the steering wheel angle, a steering wheel angular velocity, or a steering torque (a second item).

The steering wheel angle, the target angle of the steering apparatus with respect to the steering wheel angle, the steering wheel angular velocity, or the steering torque is reasonable and effective as an element for determining whether or not the steering input is the overriding.

In another aspect of the control apparatus for the vehicle of the present invention, the control apparatus is provided with a first filtering device for passing a low frequency band component of the steering input associated with the overriding, and for attenuating or cutting off a middle-high frequency band component other than the low frequency band component, wherein the determining device determines that the steering input is the overriding if magnitude of a first filter output which is an output of the first filtering device is greater than or equal to a predetermined value (a third item).

According to this aspect, it is determined that the steering input is the overriding if the first filter output which is the output of the first filtering device is greater than or equal to the predetermined value. It is therefore possible to accurately determine whether or not the steering input is the overriding.

The first filtering device in this aspect is a so-called low pass filter (LPF) of an analog type or a digital type, or a device having a function which is similar to it, and is configured to pass the low frequency band component of the steering input, and to attenuate or cut off the middle-high frequency band component other than the low frequency band component. The low frequency band is set to include a typical frequency band of the overriding, experimentally, experientially, or theoretically in advance.

The "passing" of the first filtering device does not necessarily mean non-attenuation. In other words, generally, it is not easy for some kind of a filter to have a binary passage characteristics in which a gain is changed from a gain 0 dB (100% passage) to a gain −∞ (0% passage) or vice versa at a certain frequency. Therefore, on the practical operating side, it is not rare to use a range in which the amount of attenuation is within a predetermined range as a passage band and to use a range in which the amount of attenuation is over the predetermined range as a cutoff band. As one index for defining the passage band and the cutoff band as described above, cutoff frequency in which the amount of attenuation is 50% (or the gain is −3 dB) is effective. In other words, it is also practically significant to define the "low frequency band associated with the overriding" in the first filtering device by using the cutoff frequency. At this time, the cutoff frequency can be set experimentally, experientially, or theoretically in advance.

According to this aspect, as the frequency of the steering input becomes higher, the magnitude of the steering input required to determine that the steering input is the overriding increases in a binary manner, a stepwise manner, or continuous manner. It is therefore possible to give significant ambiguity to the practical operation of the track control in a frequency region in which it is not necessarily easy to distinguish between the overriding and the disturbance.

For example, although the steering input on the higher frequency side which hardly occurs in the overriding performed by the driver to reflect his or her personality or preference is the overriding if the steering input is performed for the purpose of avoiding an obstacle on a road surface or the like; however, this steering input is likely mistakenly determined to be the disturbance if only the frequency of the steering input is considered. In contrast, according to the present invention, the frequency and the magnitude are considered. Considering that the magnitude of the steering input having this type of emergent meaning is relatively large, this type of overriding can be accurately detected depending on the setting of the predetermined value. In other words, according to this aspect, the overriding can be flexibly reflected in the track control.

In one aspect of the control apparatus for the vehicle of the present invention provided with the first filtering device, the control apparatus is provided with a first dead zone processing device for performing a first dead zone process on the first filter output, wherein the first dead zone process regards a range in which absolute value of the first filter output is less than or equal to a first reference value as a dead zone; and a second target controlled variable setting device for setting a second target controlled variable regarding the steering apparatus corresponding to the steering input on the basis of a first dead zone output which is an output of the first dead zone processing device, wherein the controlling device controls the steering apparatus on the basis of the set first and second target controlled variables According to this aspect, the second target controlled variable corresponding to the steering input is set on the basis of the first dead zone output which is obtained as a result of further performing the first dead zone process on the first filter output. Moreover, the steering apparatus is controlled on the basis of the set second target controlled variable and the first target controlled variable associated with the track control. Therefore, in the process of making the vehicle's track follow the target track, it is possible to quickly suppress the change in the vehicle's behavior due to the disturbance while reflecting the driver's intention in the vehicle' track. Incidentally, if the steering input is the controlled variable of the steering apparatus corresponding to the steering wheel angle, the steering wheel angular velocity, the steering torque or the like, then, the second target controlled variable setting device may use the first dead zone output as the second target controlled variable without change.

Incidentally, the "dead zone" in the first dead zone process means a range in which the first filter output is not reflected in the control on the downstream side (i.e. the control of the steering apparatus), or a range in which the first filter output is significantly attenuated and then reflected in the control on the downstream side. For example, if the first dead zone output is obtained by multiplying the first filter output by a correction coefficient K, the correction coefficient K may be set to "0" in a range which is less than or equal to the first reference value, and set to "1" in a range which is greater than the first reference value. Incidentally, the reason why the value used to be compared with the first reference value is the absolute value of the first filter output is that the steering input can occur in both left and right steering directions, and that the steering direction is desirably managed with positive and negative signs.

Incidentally, the first reference value in this aspect is a threshold value for regarding the first filter output whose absolute value is greater than the first reference value as the magnitude of the overriding. Thus, the first reference value may be preferably a value equal to the "predetermined value" of the overriding determination applied by the determining device to the first filter output.

Incidentally, in this aspect, the first reference value may be set according to response characteristics of the vehicle with respect to the steering input (a fifth item).

The response characteristics of the vehicle with respect to the steering input such as, for example, lateral acceleration, yaw direction acceleration and the like of the vehicle with respect to the steering wheel angle varies depending on the driving condition of the vehicle such as a vehicle speed and the like. Therefore, if the aforementioned first reference value is uniquely fixed to the driving condition of the vehicle, the extent of the reflection of the overriding in the track control varies depending on the driving condition, which is likely causes the driver' uncomfortable feeling.

According to this aspect, the first reference value is set according to the response characteristics of the vehicle as described above. Thus, the extent of the reflection of the overriding in the track control can be stabilized, and a deterioration of drivability can be suppressed. Incidentally, in the case of the vehicle speed, the first reference value is set to be lower (or higher) on a higher vehicle speed side (or a lower vehicle speed side). This is because the sensitivity of the vehicle's response to the steering input increases as the vehicle speed increases, and that the steering input for realizing one vehicle response is relatively reduced.

In one aspect of the control apparatus for the vehicle of the present invention provided with the first filtering device, cutoff frequency of the first filtering device is a lower frequency side value than yaw resonance frequency of the vehicle (a sixth item).

According to this aspect, the steering input corresponding to the yaw resonance frequency is attenuated at least by 50% or more and is thus hardly detected as the overriding. It is therefore possible to prevent the yaw resonance of the vehicle while certainly reflecting the overriding, in which the vehicle's behavior is within expectations of the driver, in the vehicle behavior.

In another aspect of the control apparatus for the vehicle of the present invention, the controlling device stops or limits the track control if it is determined that the steering input is the overriding.

According to this aspect, since the track control is stopped or limited upon occurrence of the overriding, the vehicle behavior control which prioritizes the driver's intention is thus realized. The expression of " . . . limits the track control"

means that an influence of the track control on the vehicle behavior is reduced to some extent. For example, such a limitation may be realized by evening the first target controlled variable for the track control in terms of time by the filtering process.

In another aspect of the control apparatus for the vehicle of the present invention, the control apparatus is provided with a second filtering device for attenuating or cutting off a low frequency band component of the set first target controlled variable associated with the overriding, and for passing a middle-high frequency band component other than the low frequency band component, if it is determined that the steering input is the overriding; and a second dead zone processing device for performing a second dead zone process on a second filter output which is an output of the second filtering device, wherein the second dead zone process regards a range in which absolute value of the second filter output is less than or equal to a second reference value as a dead zone, wherein the controlling device controls the steering apparatus on the basis of a second dead zone output which is an output of the second dead zone process (an eighth item).

According to this aspect, the steering apparatus is controlled on the basis of the second dead zone output which is obtained as a result of further performing the second dead zone process on the second filter output which is the output value of the second filtering device. Therefore, in the process of making the vehicle track follow the target track, it is possible not to apply the track control to the change in the vehicle' behavior due to the overriding which is the low frequency steering input, and it is possible to quickly suppress the change in the vehicle's behavior due to the disturbance.

The second filtering device in this aspect is a so-called high pass filter (HPF) of an analog type or a digital type or a device having a function which is similar to it, and is configured to attenuate or cut off the low frequency band component of the first target controlled variable, and to pass the middle-high frequency band component other than the low frequency band component. The low frequency band is set to include the typical frequency band of the overriding, experimentally, experientially, or theoretically in advance. The low frequency band may not be equal to the low frequency band associated with the filtering characteristics of the first filtering device described above.

The "passing" of the second filtering device does not necessarily mean non-attenuation. In other words, it is not easy for some kind of a filter to have a binary passage characteristics in which the gain is changed from the gain 0 dB (100% passage) to the gain $-\infty$ (0% passage) or vice versa at a certain frequency. Therefore, on the practical operating side, it is not rare to use a range in which the amount of attenuation is within a predetermined range as the passage band and to use a range in which the amount of attenuation is over the predetermined range as the cutoff band. As one index for defining the passage band and the cutoff band as described above, the cutoff frequency in which the amount of attenuation is 50% (or the gain is −3 dB) is effective. In other words, it is also practically significant to define the "low frequency band associated with the overriding" in the second filtering device by using the cutoff frequency. At this time, the cutoff frequency can be set experimentally, experientially, or theoretically in advance.

According to this aspect, as the frequency of the first target controlled variable becomes lower, the magnitude of the first target controlled variable required to be reflected in the track control increases in a binary manner, a stepwise manner, or continuous manner. It is therefore possible to give significant ambiguity to the practical operation of the track control in a frequency region in which it is not necessarily easy to distinguish between the overriding and the disturbance.

For example, although an unexpected steering input of the driver, i.e. a steering input associated with, for example, dozing, looking away, looking aside, or the like, likely belongs to the overriding from the viewpoint of frequency, it is hard to say that it is the steering input based on the driver's intention. However, the change in the vehicle's behavior due to the steering input as described above is not corrected if only the frequency of the first target controlled variable is simply considered. In contrast, according to the present invention, the frequency and the magnitude are considered. Thus, if this type of steering input, which can occur in a case where the driver is not aware despite the driver's steering operation, occurs on a relatively large scale, then, the steering input can be detected depending on the setting of the predetermined value. In other words, according to this aspect, the track control can be made more suitable for various driving conditions which can actually occurs.

Incidentally, the "dead zone" in the second dead zone process means a range in which the second filter output is not reflected in the control on the downstream side (i.e. the control of the steering apparatus), or a range in which the second filter output is significantly attenuated and then reflected in the control on the downstream side. For example, if the second dead zone output is obtained by multiplying the second filter output by the correction coefficient K, the correction coefficient K may be set to "0" in a range which is less than or equal to the second reference value, and set to "1" in a range which is greater than the second reference value. Incidentally, the reason why the value used to be compared with the second reference value is the absolute value of the second filter output is that the steering input can occur in both the left and right steering directions, and that the steering direction is desirably managed with the positive and negative signs.

Incidentally, in this aspect, cutoff frequency of the second filtering device may be a higher frequency side value than yaw resonance frequency of the vehicle (a ninth item).

According to this aspect, the first target controlled variable corresponding to the yaw resonance frequency is attenuated at least by 50% or more and is thus hardly reflected in the track control. It is therefore possible to prevent the yaw resonance of the vehicle in the track control.

In another aspect of the control apparatus for the vehicle of the present invention, the control apparatus is provided with a first filtering device for passing a first low frequency band component of the steering input associated with the overriding, and for attenuating or cutting off a first middle-high frequency band component other than the first low frequency band component; a first dead zone processing device for performing a first dead zone process on a first filter output which is an output of the first filtering device, wherein the first dead zone process regards a range in which absolute value of the first filter output is less than or equal to a first reference value as a dead zone; a second target controlled variable setting device for setting a second target controlled variable regarding the steering apparatus corresponding to the steering input on the basis of a first dead zone output which is an output of the first dead zone processing device; a second filtering device for attenuating or cutting off a second low frequency band component of the set first target controlled variable associated with the overriding, and for passing a second middle-high frequency band component other than the second low frequency band component, if it is determined that the steering input is the overriding; and a second dead zone processing device for performing a second dead zone process on a second filter output which is an output of the second filtering device, wherein the second dead zone process regards a range in which absolute value of the second filter output is less than or equal to a second reference value as a dead zone, wherein the determining device determines that the steering input is the overriding if magnitude of the first filter output is greater than or equal to a predetermined value, and the controlling device controls the steering apparatus on the basis of a second dead zone output which is an output of the second dead zone processing device and the set second target controlled variable (a tenth item).

According to this aspect, the overriding determination based on the comparison of the magnitude of the first filter output and the predetermined value, the setting of the second target controlled variable based on the first dead zone output and the accompanying control of the steering apparatus, and the control of the steering apparatus based on the second dead zone output, which are all described above, are cooperatively performed. In other words, it is possible to accurately determine whether or not the steering input is the overriding, to accurately reflect the overriding in the track control, to prevent the interference between the vehicle's behavior due to the overriding and the vehicle' behavior due to the track control, and to quickly suppress the vehicle's behavior due to the disturbance. Therefore, the high-quality track control can be realized.

In one aspect of the control apparatus for the vehicle of the present invention provided with the first and second dead zone processing devices, cutoff frequency of the second filtering device is set on a higher frequency side than cutoff frequency of the first filtering device (a eleventh item).

If the cutoff frequency is set in the both filtering processes as described above, it is then possible to certainly prevent the interference between the vehicle's behavior due to the overriding and the vehicle's behavior due to the track control.

In another aspect of the control apparatus for the vehicle of the present invention provided with the first and second dead zone processing devices, the cutoff frequency of the second filtering device is a higher frequency side value than yaw resonance frequency of the vehicle (a twelfth item).

In this manner, the first target controlled variable corresponding to the yaw resonance frequency is attenuated at least by 50% or more and is thus hardly reflected in the track control. It is therefore possible to prevent the yaw resonance of the vehicle in the track control.

In another aspect of the control apparatus for the vehicle of the present invention provided with the first and second dead zone processing devices, cutoff frequency of the first filtering device is a lower frequency side value than yaw resonance frequency of the vehicle (a thirteenth item).

According to this aspect, the steering input corresponding to the yaw resonance frequency is attenuated at least by 50% or more and is thus hardly detected as the overriding. It is therefore possible to prevent the yaw resonance of the vehicle while certainly reflecting the overriding in which the vehicle's behavior is within expectations of the driver, in the vehicle's behavior.

In another aspect of the control apparatus for the vehicle of the present invention provided with the first and second dead zone processing devices, a learning device for learning steering characteristics of a driver; and a cutoff frequency setting device for setting cutoff frequency of the first filtering device according to the learned steering characteristics (a fourteenth item).

According to this aspect, the steering characteristics which vary depending on the driver's sex, physical characteristics, personality, preference, or individual specific circumstances are learned and used to set the cutoff frequency of the first filtering device. Preferably, the cutoff frequency is set according to the maximum output frequency of the driver. For example, if the driver is weak (e.g. a female or an elderly person), the cutoff frequency of the first filtering device is changed to the lower frequency side. It is therefore possible to increase the frequency band in which the steering input is treated as the disturbance as much as possible without reducing the accuracy of the overriding determination.

Incidentally, a practical aspect of the learning by the learning device is not particularly limited, and various known learning algorithms can be applied. As an example, it is also possible to make progress on the learning by detecting the frequency of the steering input in a case where there is the steering input accompanied by a certain degree of change or a larger change in steering angle, and by updating the maximum value of the frequency as the steering characteristics of the driver as occasion demands. Incidentally, the learning process as described above is not necessarily performed when the track control is performed, and may be desirably started or completed before the track control is performed. In this manner, the cutoff frequency of the first filtering device can be optimized at a state at which the track control is started.

The operation and other advantages of the present invention will become more apparent from an embodiment explained below.

DESCRIPTION OF EMBODIMENTS

<Embodiment of the Invention>

Hereinafter, an embodiment of the control apparatus for the vehicle of the present invention will be explained with reference to the drawings, as occasion demands.

<Configuration of Embodiment>

Figure 1:
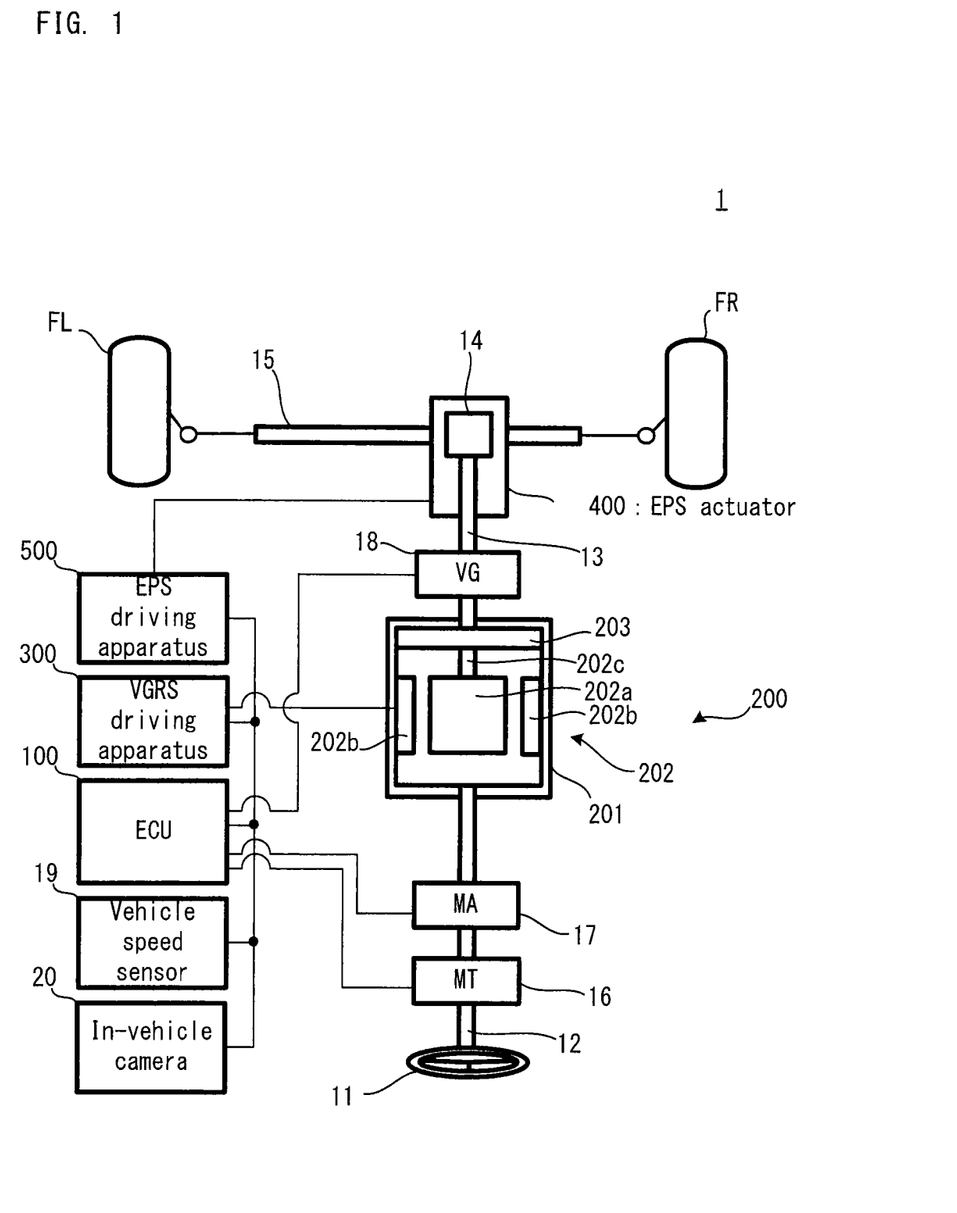
FIG. 1 is a schematic configuration diagram conceptually illustrating a configuration of a vehicle in a first embodiment.

Firstly, a configuration of a vehicle 1 in the embodiment will be explained with reference to FIG. 1. FIG. 1 is a schematic configuration diagram conceptually illustrating the configuration of the vehicle 1.

In FIG. 1, the vehicle 1 is provided with a pair of front wheels FL and FR as steered wheels, and is configured to move in a desired direction due to the steering or turning of the right and left front wheels. The vehicle 1 is provided with an electronic control unit (ECU) 100, a VGRS actuator 200, a VGRS driving apparatus 300, an EPS actuator 400, and an EPS driving apparatus 500.

The ECU 100 is an electronic control unit which is provided with a central processing unit (CPU), a read only memory (ROM), and a random access memory (RAM), each of which is not illustrated. The ECU 100 is one example of the "control apparatus for the vehicle" of the present invention. The ECU 100 is a control apparatus which is configured to overall control the operation of the vehicle 1, and is configured to perform LKA control described later, in accordance with a control program stored in the ROM. The LKA control is a control to make a driving track of the vehicle 1 follow a target track (or a target driving route), and is one example of the "track control" of the present invention. The configuration of the ECU 100 as described above is merely one example of the practical aspects which the control apparatus for the vehicle of the present invention can adopt. The control apparatus for the vehicle of the present invention may be a sub-processor or the like which operates under control from another control apparatus which is configured to overall control the operation of the vehicle 1.

In the vehicle 1, a steering input given by a driver via a steering wheel 11 is transmitted to an upper steering shaft 12 as a rotating shaft which is coaxially rotatably coupled with the steering wheel 11 and which can rotate in the same direction as that of the steering wheel 11. The upper steering shaft 12 is a steering input shaft coupled with the VGRS actuator 200 at an end on the downstream side thereof.

The VGRS actuator 200 is one example of the "steering apparatus" of the present invention, which is provided with a housing 201, a VGRS motor 202 and a speed reduction mechanism 203.

The housing 201 is a case of the VGRS actuator 200 which accommodates therein the VGRS motor 202 and the speed reduction mechanism 203. The end portion of the upper steering shaft 12 on the downstream side as described above is fixed to the housing 201, and the housing 201 and the upper steering shaft 12 can rotate integrally.

The VGRS motor 202 is a DC brushless motor having a rotor 202a as a rotator, a stator 202b as a stationary part, and a rotating shaft 202c as the output shaft of a driving force. The stator 202b is fixed to the inside of the housing 201, and the rotor 202a is rotatably held within the housing 201. The rotating shaft 202c is coaxially rotatably fixed to the rotor 202a, and its end on the downstream side is coupled with the speed reduction mechanism 203.

The speed reduction mechanism 203 is a planetary gear mechanism having a plurality of rotating elements (a sun gear, a carrier, and a ring gear) which can perform differential rotation. Among the plurality of rotating elements, the sun gear is coupled with the rotating shaft 202c of the VGRS motor 202, and the carrier is coupled with the housing 201. The ring gear is coupled with a lower steering shaft 13.

According to the speed reduction mechanism 203 having such a configuration, the rotational speed of the upper steering shaft 12 according to the operation amount of the steering wheel 11 (i.e. the rotational speed of the housing 201 which is coupled with the carrier) and the rotational speed of the VGRS motor 202 (i.e. the rotational speed of the rotating shaft 202c which is coupled with the sun gear) uniquely define the rotational speed of the lower steering shaft 13 which is coupled with the ring gear as the remaining one rotating element. At this time, it is possible to perform increase/reduction control on the rotational speed of the lower steering shaft 13 by performing increase/reduction control on the rotational speed of the VGRS motor 202 by means of the differential action between the rotating elements. In other words, the upper steering shaft 12 and the lower steering shaft 13 can relatively rotate by the action of the VGRS motor 202 and the speed reduction mechanism 203. Moreover, In terms of the configuration of each rotating element in the speed reduction mechanism 203, the rotational speed of the VGRS motor 202 is transmitted to the lower steering shaft 13 in a state of being reduced according to a predetermined reduction ratio which is defined according to a gear ratio between the rotating elements.

As described above, in the vehicle 1, since the upper steering shaft 12 and the lower steering shaft 13 can relatively rotate, a steering transmission ratio is continuously variable in a predetermined set range, wherein the steering transmission ratio is a ratio between a steering wheel angle MA as the rotation amount of the upper steering shaft 12 and a steering angle of the left and right front wheels as the steered wheels which is uniquely defined according to a final steering wheel angle θst as the rotation amount of the lower steering shaft 13 (which is also related to the gear ratio of a rack and pinion mechanism described later).

Incidentally, the speed reduction mechanism 203 may have not only the planetary gear mechanism exemplified herein but also another aspect (e.g. an aspect of coupling gears having different numbers of teeth with the upper steering shaft 12 and the lower steering shaft 13, installing a flexible gear which is in contact with each gear in a portion and rotating the flexible gear by motor torque transmitted via a wave generator, thereby relatively rotating the upper steering shaft 12 and the lower steering shaft 13). The speed reduction mechanism 203 may have a physical, mechanical, or mechanistic aspect different from the above aspect.

The VGRS driving apparatus 300 is an electric drive circuit including a PWM circuit, a transistor circuit, and inverter or the like, configured to electrify the stator 202b of the VGRS motor 202. The VGRS driving apparatus 300 is electrically connected to a not-illustrated battery, and is configured to supply drive voltage to the VGRS motor 202 by electric power supplied from the battery. The VGRS driving apparatus 300 is also electrically connected to the ECU 100, and the operation thereof is controlled by the ECU 100. The VGRS driving apparatus 300 and the VGRS actuator 200 constitute one example of the "steering apparatus" of the present invention.

The rotation of the lower steering shaft 13 is transmitted to the rack and pinion mechanism. The rack and pinion mechanism is a steering transmission mechanism including a pinion gear 14 connected to an end of the lower steering shaft 13 on the downstream side and a rack bar 15 in which gear teeth engaging with the gear teeth of the pinion gear are formed. The rotation of the pinion gear 14 is converted to a horizontal motion of the rack bar 15 in FIG. 1, by which a steering force is transmitted to each steered wheel via a tie rod and a knuckle (whose reference numerals are omitted) coupled with both ends of the rack bar 15.

The EPS actuator 400 is provided with an EPS motor as a DC brushless motor including: a not-illustrated rotor as a rotator to which a permanent magnet is attached; and a stator as a stationary part which surrounds the rotor. The EPS motor can generate assist torque TA in a direction of rotation of the rotor, which is rotated by the action of a rotating magnetic field formed in the EPS motor due to the electrification to the stator via the EPS driving apparatus 500.

On the other hand, a not-illustrated reduction gear is fixed to a motor shaft as the rotating shaft of the EPS motor, and the reduction gear also engages with the pinion gear 14. Thus, the assist torque TA generated from the EPS motor functions as assist torque for assisting the rotation of the pinion gear 14. The pinion gear is coupled with the lower steering shaft 13 as described above, and the lower steering shaft 13 is coupled with the upper steering shaft 12 via the VGRS actuator 200. Therefore, steering torque MT applied to the upper steering shaft 12 is transmitted to the rack bar 15 in a manner of being assisted by the assist torque TA as occasion demands, which reduces a driver's steering load.

The EPS driving apparatus 500 is an electric drive circuit including a PWM circuit, a transistor circuit, and inverter or the like, configured to electrify the stator of the EPS motor. The EPS driving apparatus 500 is electrically connected to a not-illustrated battery, and is configured to supply drive voltage to the EPS motor by electric power supplied from the battery. The EPS driving apparatus 500 is also electrically connected to the ECU 100, and the operation thereof is controlled by the ECU 100. The EPS actuator 400 and the EPS driving apparatus 500 constitute another example of the "steering apparatus" of the present invention.

The vehicle 1 is provided with various sensors including a steering torque sensor 16, a steering wheel angle sensor 17 and a rotation sensor 18.

The steering torque sensor 16 is a sensor which is configured to detect the steering torque MT given via the steering wheel 11 from a driver.

Specifically, the upper steering shaft 12 has such a structure that it is divided into an upstream part and a downstream part and that the parts are mutually coupled by using a not-illustrated torsion bar. Rings for detecting a rotational phase difference are fixed to both of an upstream-side end and a downstream-side end of the torsion bar. The torsion bar is configured to be twisted in its rotational direction according to the steering torque (i.e. the steering torque MT) which is transmitted via the upstream part of the upper steering shaft 12 when the driver of the vehicle 1 operates the steering wheel 11, and to be capable of transmitting the steering torque the downstream part while generating the twist generated. Therefore, upon the transmission of the steering torque, there is the rotational phase difference between the rings for detecting the rotational phase difference described above. The steering torque sensor 16 is configured to detect the rotational phase difference, to convert the rotational phase difference to the steering torque, and to output it as an electrical signal corresponding to the steering torque MT. The steering torque sensor 16 is electrically connected to the ECU 100, and the detected steering torque MT is referred to by the ECU 100 with a regular or irregular period.

The steering wheel angle sensor 17 is an angle sensor which is configured to detect the steering wheel angle MA which indicates the rotation amount of the upper steering shaft 12. The steering wheel angle sensor 17 is electrically connected to the ECU 100, and the detected steering wheel angle MA is referred to by the ECU 100 with a regular or irregular period. In the embodiment, the detected steering wheel angle MA is used as one example of the "steering input" of the present invention.

The VGRS rotation angle sensor 18 is a rotary encoder which is configured to detect a VGRS relative rotation angle θvgrs as a rotational phase difference between the housing 201 of the VGRS actuator 200 (i.e. equivalent to the upper steering shaft 12 in terms of the rotation angle) and the lower steering shaft 13. The VGRS rotation angle sensor 18 is electrically connected to the ECU 100, and the detected VGRS relative rotation angle θvgrs is referred to by the ECU 100 with a regular or irregular period. The aforementioned final steering wheel angle θst is the sum of the steering wheel angle MA and the VGRS relative rotation angle θvgrs.

The vehicle speed sensor 19 is a sensor which is configured to detect a vehicle speed Vv as the speed or velocity of the vehicle 1. The vehicle speed sensor 19 is electrically connected to the ECU 100, and the detected vehicle speed Vv is referred to by the ECU 100 with a regular or irregular period.

The in-vehicle camera 20 is an imaging apparatus, disposed on the front nose of the vehicle 1 and configured to image a predetermined area ahead of the vehicle 1. The in-vehicle camera 20 is electrically connected to the ECU 100, and the imaged area ahead is transmitted to the ECU 100 as image data with a regular or irregular period. The ECU 100 can analyze the image data and obtain various data necessary for the LKA control described later.

The "steering apparatus" of the present invention includes an apparatus which is capable of changing a steering state of the vehicle. For example, the steering apparatus of the present invention may be a steering transmission ratio varying apparatus, such as variable gear ratio steering (VGRS) exemplified as one example in the embodiment, which is capable of changing a relative rotation angle between a steering input shaft coupled with the steering wheel side and a steering output shaft coupled with the steered wheels. Alternatively, the steering apparatus of the present invention may be a steering angle varying apparatus, such as steer by wire (SBW), which directly control the steering angle by supplying the steered wheels with a driving force for prompting a change of the steering angle (also referred to as an actual steering angle or a turning angle). Alternatively, the steering apparatus of the present invention may be a steering torque assisting apparatus, such as electronic power steering (EPS) exemplified as one example in the embodiment, which prompts the change of the steering angle of the steered wheels by applying the steering torque to the steering shaft or the like. In addition, the steering apparatus of the present invention may be an apparatus which changes a yaw moment and a vehicle body slip angle in the vehicle by changing a left-right braking/driving force difference of at least one of the front wheels and rear wheels.

<Operation of Embodiment>

Figure 2:
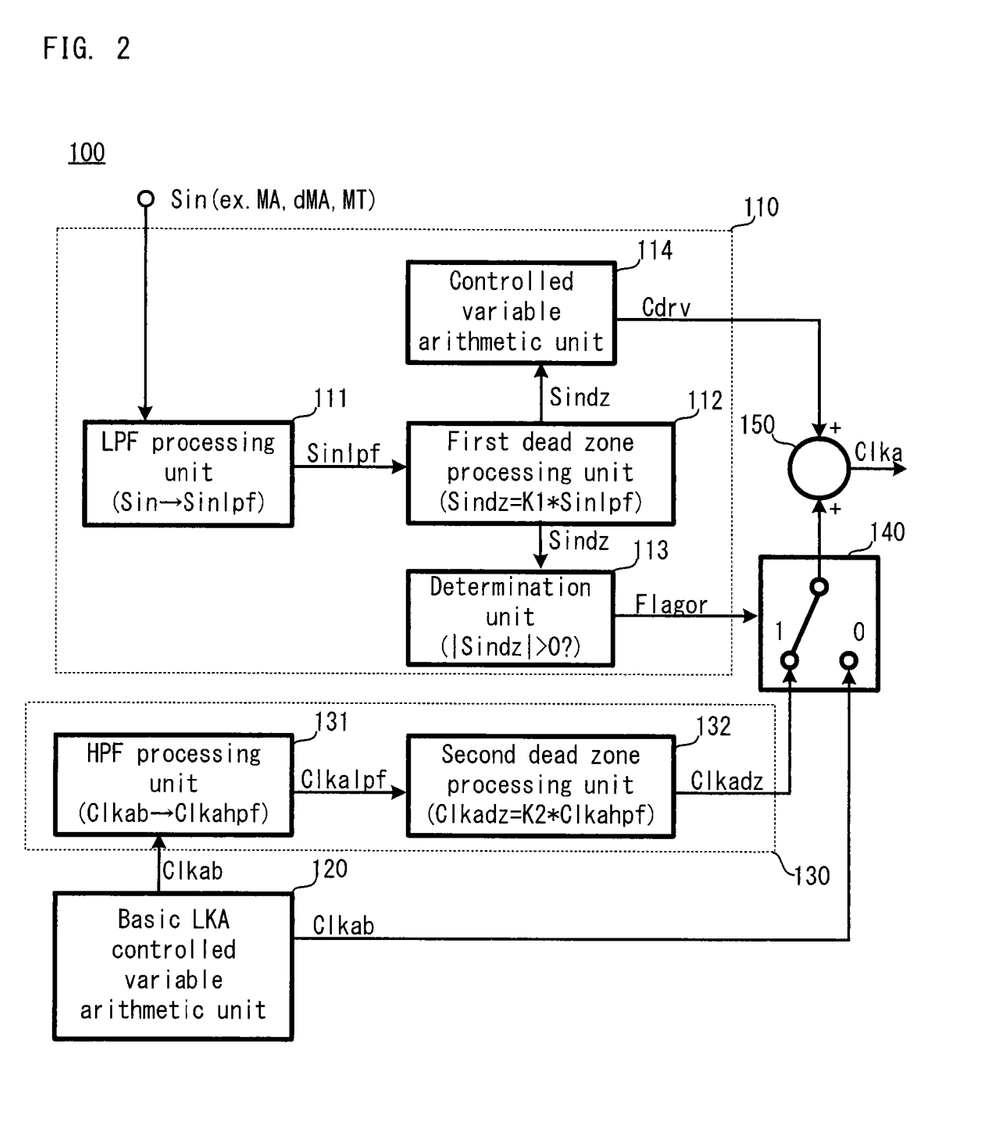
FIG. 2 is a conceptual block diagram illustrating an ECU when LKA control is performed in the vehicle illustrated in FIG. 1.

Next, with reference to FIG. 2, the LKA control will be explained as the operation of the embodiment. FIG. 2 is a conceptual block diagram illustrating a part of the ECU related to the LKA control. In FIG. 2, a duplicate part of FIG. 1 will carry the same reference numeral, and the explanation thereof will be omitted as occasion demands. For the explanation of the LKA control, it is necessary to explain a detailed configuration of the ECU 100. Here, the LKA control will be explained together with the configuration of the ECU 100 when necessary. Incidentally, in the embodiment, the LKA control is performed as a result of the driver's operation of an operation button for starting the LKA control which is disposed in a vehicle interior of the vehicle 1, or the like.

In FIG. 2, the ECU 100 is provided with an overriding determination unit 110, a basic LKA controlled variable arithmetic unit 120, an overriding cooperative control unit 130, a switching apparatus 140, and an adder 150.

The overriding determination unit 110 is provided with a LPF processing unit 111, a first dead zone processing unit 112, a determination unit 113, and a controlled variable arithmetic unit 114, and is configured to process a steering input Sin in the LKA control. As the steering input Sin, for example, the steering wheel angle MA, steering wheel angular velocity dMA, the final steering wheel angle θst, the steering torque MT and the like can be used. In the embodiments, the steering wheel angle MA is used.

The LPF processing unit 111 is a so-called LPF which attenuates a middle-high frequency component of the steering input Sin and extracts its low frequency component. The LPF processing unit 111 is one example of the "first filtering device" of the present invention. The LPF processing unit 111 may be some kind of an analog filter such as a RC filter or may be some kind of a digital filter. The LPF processing unit 111 is configured to attenuate the steering input Sin in accordance with a predetermined LPF gain and to convert it to a LPF output Sinlpf. The LPF output Sinlpf is one example of the "first filter output" of the present invention.

Figure 3:
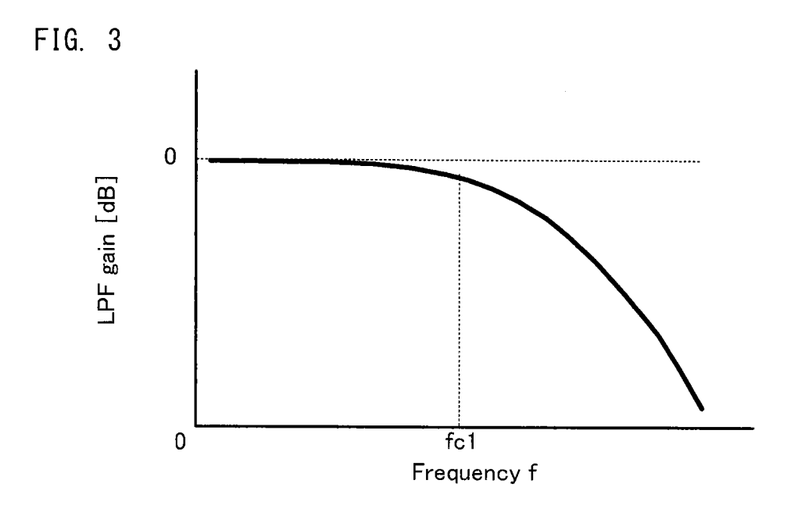
FIG. 3 is a diagram exemplifying gain characteristics of a LPF processing unit illustrated in FIG. 2.

Now, with reference to FIG. 3, the characteristics of the LPF processing unit 111 will be explained. FIG. 3 is a diagram exemplifying gain characteristics of the LPF processing unit 111.

FIG. 3 illustrates the LPF gain (dB) which is the gain of the LPF processing unit 111 on the vertical axis, and frequency f on the horizontal axis. The maximum value of the LPF gain is approximately 0 dB, and most of an input signal passes without attenuating in a low frequency region which is less than cutoff frequency fc. The cutoff frequency fc at which 50% of the input signal attenuates (or the gain becomes −3 dB) is fc1 (fc1=about 1 Hz), and is set to be a value which is lower than yaw resonance frequency fy which is unique to the vehicle 1.

Incidentally, the LPF processing unit 111 in the embodiment is configured as a filter circuit, and thus, a process of specifying the frequency of the steering input Sin is not always necessary. On the other hand, the frequency of the steering wheel angle MA can be also calculated by performing known fast Fourier transfer (FFT) on the steering wheel angle MA detected by the steering wheel angle sensor 17. In this case, the steering wheel angle MA may be attenuated to obtain an output which is equivalent to the LPF output Sinlpf in accordance with the calculated frequency and attenuation characteristics similar to the LPF gain of the LPF processing unit 111, instead of the filtering by the LPF processing unit 111.

Back in FIG. 2, the LPF output Sinlpf outputted from the LPF processing unit 111 is inputted to the first dead zone processing unit 112. The first dead zone processing unit 112 is an arithmetic operation circuit which performs a first dead zone process according to the following equation (1) on the LPF output Sinlpf and to output a first dead zone output Sindz. The first dead zone processing unit 112 is one example of the "first dead zone processing device" of the present invention. Incidentally, K1 in the following equation (1) is a correction coefficient.

$$Sindz = K1 * Sinlpf \quad (1)$$

Figure 4:
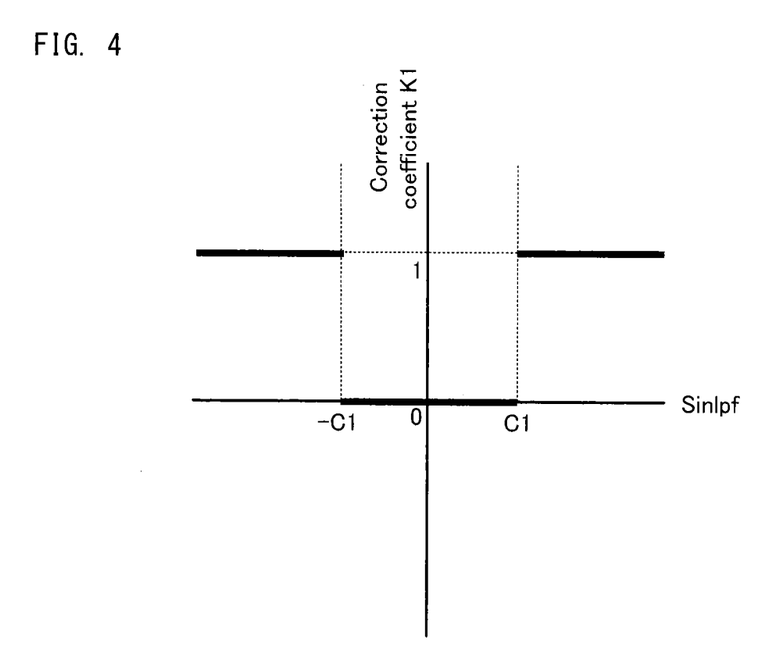
FIG. 4 is a diagram explaining a first dead zone process by a first dead zone processing unit illustrated in FIG. 2.

Now, with reference to FIG. 4, the first dead zone process will be explained. FIG. 4 is a diagram explaining the first dead zone process.

FIG. 4 illustrates the correction coefficient K1 on the vertical axis and the LPF output Sinlpf on the horizontal axis.

In FIG. 4, a positive region of the LPF output Sinlpf corresponds to one steering direction of the vehicle 1, and a negative region corresponds to the other steering direction. In a range in which the absolute value of the LPF output Sinlpf is less than a first reference value C1, the correction coefficient K1 is zero, and the first dead zone output Sindz is zero according to the equation (1) described above. In other words, a region which satisfies a relation of "−C1<Sinlpf<C1" is one example of the "dead zone" of the present invention.

On the other hand, in a range in which the absolute value of the LPF output Sinlpf is greater than or equal to the first reference value C1, the correction coefficient K1 is 1, and the first dead zone output Sindz is equal to the LPF output Sinlpf according to the equation (1) described above. In other words, the first dead zone process is a process of invalidating the LPF output Sinlpf which is less than or equal to a predetermined value.

The first reference value C1 which defines the dead zone of the first dead zone process is an adaptation value which is set in advance experimentally, experientially, or theoretically, and a plurality of values are prepared in advance according to the vehicle speed Vv. The first dead zone processing unit 112 is configured to select the first reference value C1 corresponding to the vehicle speed Vv of the vehicle 1 at that time point and to use it for the first dead zone process.

As described above, by changing the first reference value C1 according to the vehicle speed Vv, overriding determination accuracy can be stabilized with respect to changes in lateral acceleration characteristics and yaw direction acceleration characteristics of the vehicle 1 according to the vehicle speed Vv.

Specifically, in a high vehicle speed region, vehicle's behavior relatively increases with respect to the change of the steering angle. Therefore, the extent of the overriding performed by the driver to realize one vehicle's behavior during the LKP control can be made small. In other words, the magnitude of the steering input Sin tends to be smaller in the higher vehicle speed region. In contrast, if the first reference value C1 which defines the dead zone is set to be constant, the driver feels, in the higher vehicle speed region, that his or her own steering input is not reflected in the vehicle's behavior during the LKA control. In order to reduce such uncomfortable feeling, in the embodiment, as the vehicle speed Vv increases, the first reference value C1 is further reduced. As a result, the overriding determination accuracy is stabilized.

Back in FIG. 2, the first dead zone output Sindz, which is an output value of the first dead zone processing unit 112, is inputted to the determination unit 113 and the controlled variable arithmetic operation 114.

The determination unit 113 is one example of the "determining device" of the present invention, which determines whether or not the steering input Sin is the overriding based on the driver's intention. The determination unit 113 is configured to set an overriding determination flag Flagor according to the absolute value of the first dead zone output Sindz. The overriding determination flag Flagor is set to "1" if the steering input Sin is determined to be the overriding, and is set to "0" if the steering input Sin is determined not to be the overriding (simply, to be the disturbance).

The determination unit 113 is configured to set the overriding determination flag Flagor to "1" if the absolute value of the first dead zone output Sindz is greater than 0, and to set the overriding determination flag Flagor to "0" if the absolute value of the first dead zone output Sindz is 0. The set overriding determination flag Flagor is transmitted to the switching apparatus 140.

Incidentally, the first dead zone output Sindz is a value which is defined by comparing the LPF output Sinlpf with the first reference value, but the LPF output Sinlpf is a value which is defined by the magnitude of the steering input Sin and the LPF gain which varies depending on the frequency of the steering input Sin. In other words, the overriding determination unit 110 determines whether or not the steering input Sin is the overriding on the basis of the magnitude and the frequency of the steering input. Qualitatively, as the frequency of the steering input Sin becomes higher, the magnitude of the steering input Sin which is required to determine that the steering input Sin is the overriding becomes larger.

The controlled variable arithmetic unit 114 is one example of the "second target controlled variable setting device" of the present invention, which calculates a driver input controlled variable Cdrv on the basis of the first dead zone output Sindz. The driver input controlled variable Cdrv is a controlled variable for reflecting the overriding of the driver in the LKA control, and the practical aspect thereof varies depending on the steering input Sin. In the embodiment, the steering wheel angle MA is used as the steering input Sin, and the driver input controlled variable Cdrv is thus the final steering wheel angle θst. The calculated driver input controlled variable Cdrv is transmitted to the adder 150.

The final steering wheel angle θst is, as described above, the sum of the steering wheel angle MA and the VGRS relative rotation angle θvgrs given according to the steering wheel angle MA. The VGRS relative rotation angle θvgrs which is to be given to the steering wheel angle MA is stored as a control map in the ROM in advance. Incidentally, the setting of the VGRS relative rotation angle θvgrs is arbitrary and is known, and the details thereof are thus omitted here. As a qualitative tendency, the VGRS relative rotation angle θvgrs decreases as the vehicle speed Vv increases. This is because a vehicle's response to the steering angle becomes quicker as the vehicle speed increases.

Next, the basic LKA controlled variable arithmetic unit 120 will be explained. The basic LKA controlled variable arithmetic unit 120 is one example of the "first target controlled variable setting device" of the present invention, which calculates a controlled variable for realizing the LKA control. The basic LKA controlled variable arithmetic unit 120 is configured to calculate a basic LKA controlled variable Clkab by a basic LKA controlled variable calculation process.

Figure 5:
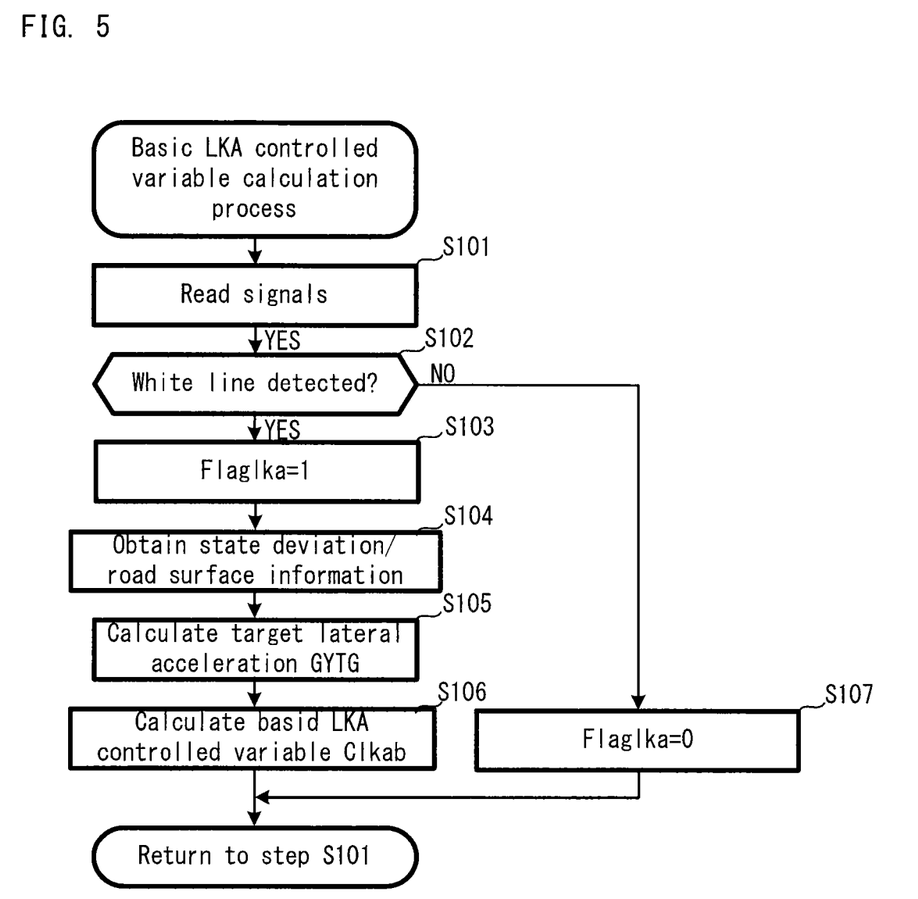
FIG. 5 is a flowchart illustrating a basic LKA controlled variable calculation process performed by the ECU in the vehicle illustrated in FIG. 1.

Now, with reference to FIG. 5, the basic LKA controlled variable calculation process will be explained. FIG. 5 is a flowchart illustrating the basic LKA controlled variable calculation process.

In FIG. 5, the basic controlled variable arithmetic unit 120 reads various signals including operation signals of various switches provided for the vehicle 1, various flags, sensor signals associated with the various sensors described above, and the like (step S101).

Then, it is determined whether or not a white line for defining the target driving route of the vehicle (which is one form of the "target track" of the present invention) in the LKA control is detected, on the basis of the image data transmitted from the in-vehicle camera 20 (step S102). If the white line is not detected (the step S102: NO), the target driving route cannot be set, and the basic LKA controlled variable arithmetic unit 120 thus sets a LKA possibility flag Flaglka to "0" which indicates that the LKA control cannot be performed (step S107), and the process is returned to the step S101.

Incidentally, the ECU 100 temporarily stops the LKA control if the LKA possibility flag Flaglka is "0". If a period of the temporal stop of the LKA control continues over a predetermined time, the ECU 100 ends the LKA control. If the LKA control is ended, the LKA control is not started unless the execution of the LKA control is required again.

On the other hand, if the white line is detected (the step S102: YES), the ECU 100 sets the aforementioned LKA possibility flag Flaglka to "1" which indicates that the LKA control can be performed (step S103), and obtains a state quantity deviation and road surface information (step S104).

The state quantity deviation is a deviation between a state quantity of the vehicle 1 and a target state quantity to be adopted for the target driving route, and has many practical aspects. The state quantity deviation may include, for example, a yaw angle deviation and a lateral position deviation, or the like between the vehicle 1 and the target driving route. On the other hand, the road surface information defines the shape of the target driving route, and may include, for example, a curvature R of the target driving route (or an inverse number of the radius of the target driving route), or the like.

The basic LKA controlled variable arithmetic unit 120 then calculates target lateral acceleration GYTG which is required to make the vehicle 1 follow the target driving route, on the basis of the state quantity deviation and the road surface information (step S105). A mutual relationship between the target lateral acceleration GYTG and the state quantity deviation and road surface information is stored as a control map in the ROM in advance.

If the target lateral acceleration GYTG is calculated, the basic LKA controlled variable Clkab is calculated as a controlled variable for obtaining the calculated target lateral acceleration GYTG (step S106). A mutual relationship between the target lateral acceleration GYTG and the basic LKA controlled variable Clkab is stored as a control map in the ROM in advance. If the basic LKA controlled variable Clkab is calculated, the process is returned to the step S101.

Here, the embodiment is configured to make the vehicle 1 follow the target driving route by changing the steering angle of the steered wheels via the VGRS actuator 200, and thus, the basic LKA controlled variable Clkab is a value corresponding to the final steering wheel angle θst. However, a practical aspect which can be adopted by the basic LKA controlled variable Clkab varies depending on an apparatus for realizing the LKA control.

For example, following the target driving route can be realized even by the control of the steering torque MT. If the steering torque MT is controlled independently of the driver's intention via the EPS actuator 400, although the steering angle of the steered wheels is not a direct control target, the steering angle also changes via each steering shaft by the given steering torque MT. Therefore, it is possible to make the vehicle 1 follow the target riving route by controlling the steering torque MT to reduce the state quantity deviation described above.

Alternatively, the VGRS actuator 200 and the EPS actuator 400 may be cooperatively controlled with each other to realize the LKA control. For example, in a case where the driver realizes hands-free driving in which the steering wheel 11 is not steered or held, if the VGRS actuator 200 is used to rotate the lower steering shaft 13, the upper steering shaft 12 is steered by reaction force from a road surface in an opposite direction in some cases because the upper steering shaft 12 to which steering-retaining force is not applied. In order to solve such a problem, the VGRS actuator 200 may be used to follow the target driving route while the steering torque corresponding to steering-retaining torque is applied via the EPS actuator 400.

Back in FIG. 2, the basic LKA controlled variable Clkab calculated by the basic LKA controlled variable arithmetic unit 120 is transmitted to the overriding cooperation control unit 130 and the switching apparatus 140.

The overriding cooperation control unit 130 is prepared to reflect the overriding of the driver in the LKA control, and is provided with a HPF processing unit 131 and a second dead zone processing unit 132. The basic LKA controlled variable Clkab is inputted to the HPF processing unit 131.

The HPF processing unit 131 is a so-called HPF which attenuates a low frequency component of the basic LKA controlled variable Clkab and extracts its middle-high frequency component. The HPF processing unit 131 is one example of the "second filtering device" of the present invention. The HPF processing unit 131 may be some kind of known analog filter such as a RC filter or may be some kind of known digital filter. The HPF processing unit 131 is configured to attenuate the basic LKA controlled variable Clkab in accordance with a predetermined HPF gain and to convert it to a HPF output Clkahpf. The HPF output Clkahpf is one example of the "second filter output" of the present invention.

Figure 6:
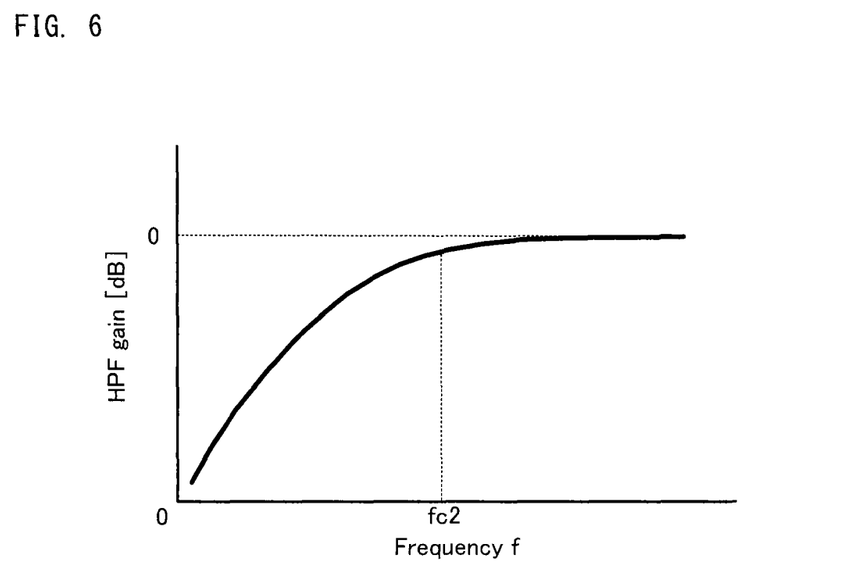
FIG. 6 is a diagram exemplifying gain characteristics of a HPF processing unit illustrated in FIG. 2.

Now, with reference to FIG. 6, the characteristics of the HPF processing unit 131 will be explained. FIG. 6 is a diagram exemplifying gain characteristics of the HPF processing unit 131.

FIG. 6 illustrates the HPF gain (dB) which is the gain of the HPF processing unit 131 on the vertical axis, and the frequency f on the horizontal axis. The maximum value of the HPF gain is approximately 0 dB, and most of an input signal passes without attenuating in a middle-high frequency region which is greater than or equal to the cut frequency fc. The cutoff frequency fc at which 50% of the input signal attenuates (or the gain becomes −3 dB) is fc2 (fc2>fc1), and is set to be a value which is higher than the yaw resonance frequency fy which is unique to the vehicle 1.

Back in FIG. 2, the HPF output Clkahpf outputted from the HPF processing unit 131 is inputted to the second dead zone processing unit 132. The second dead zone processing unit 132 is an arithmetic operation circuit which performs a second dead zone process according to the following equation (2) on the HPF output Clkahpf and to output a second dead zone output Clkadz. The second dead zone processing unit 132 is one example of the "second dead zone processing device" of the present invention. Incidentally, K2 in the following equation (2) is a correction coefficient.

$$Clkadz = K2 * Clkahpf \quad (2)$$

Figure 7:
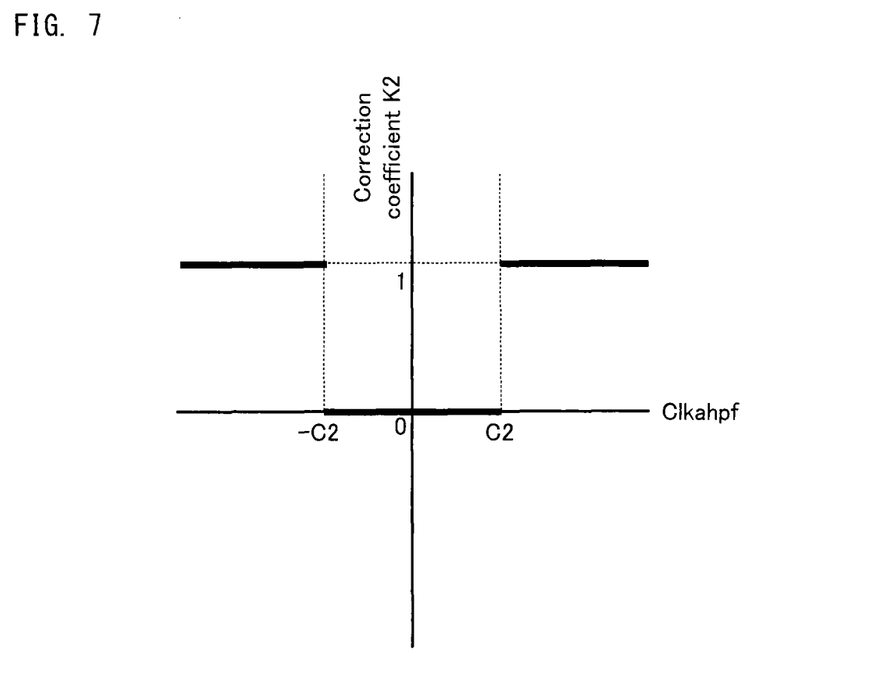
FIG. 7 is a diagram explaining a second dead zone process by a second dead zone processing unit illustrated in FIG. 2.

Now, with reference to FIG. 7, the second dead zone process will be explained. FIG. 7 is a diagram explaining the second dead zone process.

FIG. 7 illustrates the correction coefficient K2 on the vertical axis and the HPF output Clkahpf on the horizontal axis.

In FIG. 7, a positive region of the HPF output Clkahpf corresponds to one steering direction of the vehicle 1, and a negative region corresponds to the other steering direction. In a range in which the absolute value of the HPF output Clkahpf is less than a second reference value C2, the correction coefficient K2 is zero, and the second dead zone output Clkadz is zero according to the equation (2) described above. In other words, a region which satisfies a relation of "−C2<Clkahpf<C2" is another example of the "dead zone" of the present invention. On the other hand, in a range in which the absolute value of the HPF output Clkahpf is greater than or equal to the second reference value C2, the correction coefficient K2 is 1, and the second dead zone output Clkadz is equal to the HPF output Clkahpf according to the equation (2) described above. In other words, the second dead zone process is a process of invalidating the HPF output Clkahpf which is less than or equal to a predetermined value.

Incidentally, the second reference value C2 which defines the dead zone of the second dead zone process is an adaptation value which is set in advance experimentally, experientially, or theoretically.

The switching apparatus 140 is a switching circuit which changes its switching state on an input side according to the overriding determination flag Flagor outputted from the determination unit 113. An output terminal of the switching apparatus 140 is electrically connected to the adder 150. The switching apparatus 140 has two input terminals, and one of the terminals is connected to the basic LKA controlled variable arithmetic unit 120. Moreover, the other terminal is connected to the second dead zone processing unit 132.

Here, if the overriding determination flag Flagor is "0", i.e. if the overriding is not detected during the LKA control, the input terminal connected to the basic LKA controlled variable arithmetic unit 120 is selected. If the overriding determination flag Flagor is "1", i.e. if the overriding is detected during the LKA control, the input terminal connected to the second dead zone processing unit 131 is selected (FIG. 2 illustrates this state).

The adder 150 is a circuit which calculates a final target controlled variable Clka of the LKA control according to the following equations (3) and (4). In the embodiment, the VGRS actuator 200 is used for the LKA control, and the final target controlled variable Clka is thus a target value of the final steering wheel angle θst. The output of the adder 150, i.e. the final target controlled variable Clka, is supplied to another control block of the ECU 100 which controls the steering apparatus for the track control (i.e. the VGRS actuator 200 and the VGRS driving apparatus 300 herein), and the vehicle's behavior is controlled according to the final target controlled variable Clka. The LKA control is performed as described above.

$$Clka = Cdrv + Clkab \quad (3)$$

$$Clka = Cdrv + Clkadz \quad (4)$$

If the overriding is not detected during the LKA control, the equation (3) is applied, and the final target controlled variable Clka is a value obtained by adding the basic LKA controlled variable Clkab and the driver input controlled variable Cdrv. If the overriding is not detected, the first dead zone output Sindz is zero, and thus, the driver input controlled variable Cdrv is also zero. In other words, in this case, the final target controlled variable Clka is equal to the basic LKA controlled variable Clkab, and the normal track control for making a driving track of the vehicle 1 follow a target track is realized.

On the other hand, if the overriding is detected during the LKA control, the equation (4) is applied, and the final target controlled variable Clka is a value obtained by adding the second dead zone output Clkadz and the driver input controlled variable Cdrv. If the overriding is detected, the first dead zone output Sindz is not zero. Particularly in a frequency band in which a signal passes while hardly being attenuated by the LPF processing unit 111 (e.g. in a low frequency band of 1 Hz or less), the steering input Sin is almost 100% reflected in the driver input controlled variable Cdrv. As a result, even during the LKA control, the overriding of the driver is reflected in the vehicle's behavior.

On the other hand, regarding the second dead zone output Clkadz, which is a target controlled variable for the LKA control used upon the detection of the overriding, the low frequency band component thereof becomes zero by the dead zone process of the second dead zone processing unit 132 as a result of the sufficient attenuation of the low frequency band corresponding to the overriding by the HPF processing unit 131. Thus, if the steering apparatus for the LKA control (i.e. the VRGS actuator 200 in the embodiment) is controlled in accordance with the final target controlled variable Clka, the previous change in vehicle's behavior due to the driver input controlled variable Cdrv is allowed without any influence by the original track control. In other words, it is possible to make the vehicle 1 follow the target driving route while certainly reflecting the overriding of the driver in the LKA control and preventing the interference between the overriding and the LKA control.

Moreover, among the steering input Sin, various disturbances which are frequency inputs higher than the overriding are cut by the dead zone process of the first dead zone processing unit 112 as a result of the attenuation by the LPF processing unit 111. Thus, in the vehicle 1, the change of the behavior due to the disturbance is preferably suppressed. If the unevenness of the road surface, road surface inclination, road surface friction, cross wind or the like among the disturbance causes the change of the behavior of the vehicle 1, resulting in the steering input Sin (i.e. in the case of so-called uncontrollable steering wheel), then, a disturbance suppression component is included in the basic LKA controlled variable Clkab and passes through the HPF processing unit 131. The disturbance suppression component is thus supplied to the adder 150 with being hardly cut even by the second dead zone processing unit 132. Therefore, the change in vehicle's behavior caused by the disturbance among the steering input is quickly suppressed by the track control of the vehicle 1 in accordance with the basic LKA controlled variable Clkab.

As described above, according to the LKA control in the embodiment, it is possible to accurately determine whether the steering input is the overriding in which the vehicle's behavior is not to be corrected by the LKA control, or the disturbance in which the vehicle's behavior is to be corrected by the track control, on the basis of the magnitude of the steering input and the frequency. Upon the determination of the overriding, it is possible to prevent the interference between the change of the behavior due to the overriding and the change of the behavior due to the LKA control, by attenuating the low frequency component of the basic LKA controlled variable Clkab for the LKA control corresponding to the overriding. On the other hand, if the steering input is the disturbance, the change of the behavior due to the disturbance can be quickly suppressed by the LKA control. In other words, the high-quality track control can be realized.

<Second Embodiment>

The first embodiment is configured to maintain the LKA control as much as possible while preventing the interference between the LKA control and the overriding by attenuating the low frequency component of the basic LKA controlled variable Clkab by the operation of the HPS processing unit 131 and the second dead zone processing unit 132, upon the determination of the overriding. A control aspect upon the determination of the overriding, however, is not limited to this. A second embodiment based on the concept described above will be explained.

As a configuration of the ECU 100 associated with the LKA control, there is such a configuration that the overriding cooperative control unit 130 is removed from the configuration illustrated in FIG. 2. In other words, if the overriding determination is performed by the determination unit 113, the switching apparatus 140 is opened. As a result, the basic LKA controlled variable Clkab is not supplied to the adder 150, and the vehicle's behavior becomes the normal vehicle's behavior according to the driver input controlled variable Cdrv. In other words, in the embodiment, the LKA control is temporarily stopped when the overriding occurs. In this manner, the initiative of the driver is established more clearly, and the driver's intention can be faithfully reflected in the vehicle behavior.

The configuration for stopping the LKA control upon the determination of the overriding is not limited to what is explained herein. For example, without preparing devices similar to the switching apparatus 140, the ECU 100 may end the LKA control upon the determination of the overriding as one process in terms of control.

Moreover, upon the determination of the overriding, the LKA control may not be ended, but some limitation method may be applied so that the change of the behavior due to the LKA control hardly occurs. For example, upon the determination of the overriding, following the target track may be made slow by multiplying the basic LK controlled variable Clkab by a correction coefficient which is less than 1. Alternatively, first filtering may be performed on the basic LKA controlled variable Clkab to entirely even the basic LKA controlled variable Clkab, and the evened variable may be supplied to the downstream side.

<Third Embodiment>

In the first and second embodiments, the determination of whether or not the steering input Sin is the overriding is realized by the overriding determination unit 110. More specifically, the overriding determination unit 110 is configured ideally to extract only the steering input corresponding to the overriding, by the operation of the LPF processing unit 111 and the first dead zone processing unit 112.

The frequency of the overriding which occurs when the LKA control is performed is substantially in a certain range (or the low frequency band described above) from a human engineering viewpoint; however, it varies according to the steering ability of the driver in a precise sense. Specifically, if a case where the driver is an adult male and a case where the driver is an adult female or an elderly person are compared, the maximum frequency of the overriding tends to be higher in the former case. Of course, if the cutoff frequency fc1 of the LPF processing unit 111 is adjusted for the former case, the overriding can be detected without any problem in the latter case which is on a lower frequency side. In view of the disturbance, however, the frequency which is supposed to be the overriding in the former case could be the disturbance in the latter case. This is because the steering characteristics when the disturbance occurs vary depending on the driver. In this regard, it is also effective to vary the cutoff frequency fc1 of the LPF processing unit 111 in a manner of reflecting the steering ability of the driver. Now, a third embodiment based on this concept will be explained.

In the third embodiment, the cutoff frequency fc1 of the LPF processing unit 111 is variable. Therefore, the LPF processing unit 111 is desirably a digital filter. The cutoff frequency of the LPF processing unit 111 is configured to be set by the LPF processing unit 111 itself according to a steering characteristics learning process performed by the ECU 100.

Here, the steering characteristics learning process is a process of learning the maximum steering frequency of the driver. The steering characteristics learning process is performed by detecting the frequency of the steering input (e.g. the aforementioned FFT process or the like may be performed) accompanied by a certain degree of change or a larger change of the steering wheel angle in a steady driving state and by updating the maximum value of the frequency of the steering input as occasion demands. The learning as described above is performed desirably in the normal driving period other than the period of performing the LKA control.

On the other hand, the LPF processing unit 111 sets the cutoff frequency fc1 on the basis of a learning value of the steering characteristics learning process (or the maximum steering frequency of the driver who is now driving the vehicle) if the LKA control is started. Specifically, as the learning value becomes smaller, i.e. the maximum steering frequency becomes lower, the cutoff frequency fc1 is changed to a lower-frequency-side value in a binary manner, a stepwise manner, or a continuous manner.

In this manner, the low frequency band which is sufficient for the steering characteristics or steering ability of the driver can be used for the overriding determination, and the LKA control suitable for the individual driver's situation.

The present invention is not limited to the aforementioned embodiments, but various changes may be made, if desired, without departing from the essence or spirit of the invention which can be read from the claims and the entire specification. A control apparatus for a vehicle, which involves such changes, is also intended to be within the technical scope of the present invention.

Reference Signs List 1 vehicle
11 steering wheel
12 upper steering shaft
100 ECU
200 VGRS actuator
300 VGRS driving apparatus

The invention claimed is:

1. A control apparatus for a vehicle which includes a controller configured to control the vehicle, the vehicle comprising a steering apparatus, the controller being configured to:
set a first target controlled variable regarding the steering apparatus for track control which makes a track of the vehicle follow a target track;
perform the track control by controlling the steering apparatus on the basis of the set first target controlled variable; and
determine whether or not the steering input is overriding on the basis of magnitude and frequency of a steering input when the track control is performed;
the controller being configured to pass a first low frequency band component of the steering input associated with the overriding, and attenuate or cut off a first middle-high frequency band component other than the first low frequency band component;
the controller being configured to perform a first dead zone process on a first filter output which is an output of the first filter, wherein the first dead zone process regards a range in which absolute value of the first filter output is less than or equal to a first reference value as a dead zone;
the controller being configured to set a second target controlled variable regarding the steering apparatus corresponding to the steering input on the basis of a first dead zone output which is an output of the first dead zone process;
the control apparatus including a second filter which is attenuate or cut off a second low frequency band component of the set first target controlled variable associated with the overriding, and pass a second middle-high frequency band component other than the second low frequency band component, if it is determined that the steering input is the overriding; and
the controller being configured to perform a second dead zone process on a second filter output which is an output of the second filter, wherein the second dead zone process regards a range in which absolute value of the second filter output is less than or equal to a second reference value as a dead zone, wherein
the controller is configured to determine that the steering input is the overriding if magnitude of the first filter output is greater than or equal to a predetermined value, and
the controller is configured to control the steering apparatus on the basis of a second dead zone output which is an output of the second dead zone process and the set second target controlled variable.

2. The control apparatus for the vehicle according to claim 1, wherein cutoff frequency of the second filter is set on a higher frequency side than cutoff frequency of the first filter.

3. The control apparatus for the vehicle according to claim 1, wherein the cutoff frequency of the second filter is a higher frequency side value than yaw resonance frequency of the vehicle.

4. The control apparatus for the vehicle according to claim 1, wherein cutoff frequency of the first filter is a lower frequency side value than yaw resonance frequency of the vehicle.

5. The control apparatus for the vehicle according to claim 1,
the controller being configured to learn steering characteristics of a driver; and
the controller being configured to set cutoff frequency of the first filter according to the learned steering characteristics.

* * * * *